(12) United States Patent
Shiiki et al.

(10) Patent No.: US 6,673,403 B1
(45) Date of Patent: *Jan. 6, 2004

(54) GAS-BARRIER, MULTI-LAYER HOLLOW CONTAINER

(75) Inventors: Zenya Shiiki, Narashino (JP); Yukichika Kawakami, Iwaki (JP); Nobuo Sato, Iwaki (JP); Mitsuru Hoshino, Iwaki (JP); Toshitaka Kouyama, Iwaki (JP)

(73) Assignee: Kureha Kagaku Kogyo K.K., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 09/254,739

(22) PCT Filed: Aug. 22, 1997

(86) PCT No.: PCT/JP97/02923

§ 371 (c)(1),
(2), (4) Date: Mar. 11, 1999

(87) PCT Pub. No.: WO98/10932

PCT Pub. Date: Mar. 19, 1998

(30) Foreign Application Priority Data

Sep. 13, 1996 (JP) ............................................. 8/265540

(51) Int. Cl.[7] ......................... B29D 22/00; B29D 23/00; B32B 1/08
(52) U.S. Cl. ................................................... 428/35.7
(58) Field of Search ............................... 428/35.7, 36.6, 428/36.7, 36.91; 264/328.16, 537, 540

(56) References Cited

U.S. PATENT DOCUMENTS

| 4,424,242 A | | 1/1984 | Barbee | |
|---|---|---|---|---|
| 4,687,689 A | * | 8/1987 | Yazaki et al. | 428/35.7 |
| 4,729,927 A | | 3/1988 | Hirose et al. | |
| 4,741,936 A | * | 5/1988 | Nohara et al. | 428/36.7 |
| 5,073,420 A | * | 12/1991 | Yano et al. | 428/35.7 |
| 5,141,698 A | | 8/1992 | Daubenbüchel et al. | |
| 5,409,751 A | * | 4/1995 | Suzuki et al. | 428/36.9 |
| 5,502,158 A | * | 3/1996 | Sinclair et al. | 528/354 |
| 5,688,586 A | * | 11/1997 | Shiiki et al. | 428/221 |
| 5,830,991 A | | 11/1998 | Shiiki et al. | 528/491 |
| 5,853,639 A | * | 12/1998 | Kawakami et al. | 264/177.19 |
| 5,908,917 A | * | 6/1999 | Kawakami et al. | 528/354 |
| 6,001,439 A | * | 12/1999 | Kawakami et al. | 428/35.7 |
| 6,046,251 A | * | 4/2000 | Kawakami et al. | 523/105 |
| 6,183,679 B1 | * | 2/2001 | Kawakami et al. | 264/143 |

FOREIGN PATENT DOCUMENTS

| EP | 0909640 | 4/1996 |
|---|---|---|
| JP | 01-153453 | 6/1989 |
| JP | 2-55133 | 2/1990 |
| JP | 9-328481 | 12/1997 |

* cited by examiner

Primary Examiner—Kenneth R. Rice
(74) Attorney, Agent, or Firm—Dinsmore & Shohl LLP

(57) ABSTRACT

The invention relates a gas barrier multi-layer hollow container having a multi-layer wall structure that a thermoplastic resin layer is laminated on at least one side of a layer formed from polyglycolic acid containing at least 60 wt. % of a repeating unit represented by the following formula (1):

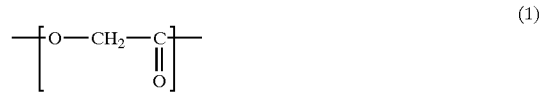

wherein the container has excellent oxygen gas barrier property and/or carbon dioxide gas barrier property, and a production process thereof.

17 Claims, No Drawings

GAS-BARRIER, MULTI-LAYER HOLLOW CONTAINER

TECHNICAL FIELD

The present invention relates to gas barrier multi-layer hollow containers, and more particularly to gas barrier multi-layer hollow containers which comprise in combination a layer of a thermoplastic resin such as polyolefin and a layer of polyglycolic acid, and by which the oxygen gas barrier property and/or carbon dioxide gas barrier property of the thermoplastic resin layer is markedly improved. The gas barrier multi-layer hollow containers according to the present invention are particularly suitable for use as various kinds of containers for drink, food, daily needs, gasoline and the like.

BACKGROUND ART

Various kinds of resin-made hollow containers have heretofore been used as containers for various goods such as drink, food, daily needs and gasoline. Specific examples thereof include hollow containers making use of a thermoplastic resin such as polyolefin, polyester, polystyrene or polyvinyl chloride. Since these hollow containers are generally insufficient in gas barrier properties such as oxygen gas barrier property and carbon dioxide gas barrier property, however, they are unsatisfactory for applications to containers for drink food, toiletry containers, etc. In order to improve the gas barrier properties of such resin-made hollow containers, there have thus been developed multi-layer hollow containers in which a gas barrier layer composed of an ethylene.vinyl alcohol copolymer (EVOH), polyamide or the like is combined with a layer of such a resin.

However, the layer formed of a gas barrier resin such as EVOH or polyamide is deteriorated in gas barrier properties to a great extent under high-temperature and high-humidity conditions. Therefore, the conventional multi-layer hollow containers containing these layers have been insufficient for hollow containers for goods which require a treating process under high-temperature and high-humidity conditions, such as retorting, goods which particularly require a long-term storage, and the like.

In recent years, biodegradable polymers, for example, polylactic acid, polysuccinate, polycaprolactone, etc., have attracted attention as plastic materials which scarcely impose burden on the environment. Hollow containers making use of these biodegradable polymers are also going to be developed. However, the hollow containers formed of these biodegradable polymers are insufficient in gas barrier properties such as oxygen gas barrier property and carbon dioxide gas barrier property. When layers of these biodegradable polymers are combined with the conventional gas barrier resin layers formed of EVOH, polyamide, etc. to improve their gas barrier properties, a problem of increasing burden on the environment has arisen.

The present inventors succeeded in producing hollow containers having excellent gas barrier properties from polyglycolic acid. However, the mere single layer of the polyglycolic acid is not always sufficient in, for example, moisture resistance, mechanical strength, profitability, etc.

DISCLOSURE OF THE INVENTION

It is an object of the present invention to provide a gas barrier multi-layer hollow container suitable for use as a container for goods which require a treating process under high-temperature and high-humidity conditions, such as retorting, goods which require a long-term storage, and the like.

Another object of the present invention is to provide a gas barrier multi-layer hollow container far excellent in oxygen gas barrier property and carbon dioxide gas barrier property.

A further object of the present invention is to provide a gas barrier multi-layer hollow container which scarcely imposes burden on the environment.

The present inventors have carried out an extensive investigation with a view toward overcoming the above-described problems involved in the prior art. As a result, it has been found that when a polyglycolic acid layer is combined with a thermoplastic resin layer, a gas barrier multi-layer hollow container, by which the oxygen gas barrier property and/or carbon dioxide gas barrier property of the thermoplastic resin layer is markedly improved, is obtained.

When in the conventional gas barrier multi-layer hollow container having a container wall of the layer structure of, for example, polyolefin/gas barrier resin/polyolefin, a polyglycolic acid layer is provided in place of the gas barrier resin layer formed of EVOH, polyamide or the like, a gas barrier multi-layer hollow container having excellent oxygen gas barrier property and carbon dioxide gas barrier property and sufficient properties for a container for goods which require a treating process under high-temperature and high-humidity conditions, and goods which require a long-term storage can be obtained.

When a gas barrier resin layer formed of EVOH, polyamide or the like is used in combination with the polyglycolic acid layer, a gas barrier multi-layer hollow container markedly improved in not only oxygen gas barrier property but also carbon dioxide gas barrier property can be obtained. When a layer of a biodegradable polymer such as polylactic acid, polysuccinate or polycaprolactone is combined with the polyglycolic acid layer, a multi-layer hollow container excellent in gas barrier properties and profitability can be obtained without impairing biodegradability (decomposability in soil).

The present invention has been led to completion on the basis of these findings.

According to the present invention, there is thus provided a gas barrier multi-layer hollow container having a multi-layer wall structure that a thermoplastic resin layer is laminated on at least one side of a layer formed from polyglycolic acid containing at least 60 wt. % of a repeating unit represented by the following formula (1):

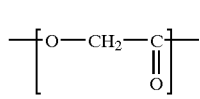

(1)

According to the present invention, there is also provided a process for producing a multi-layer hollow container, which comprises respectively heating and melting polyglycolic acid containing at least 60 wt. % of a repeating unit represented by the following formula (1):

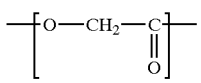

at least one thermoplastic resin, and optionally an adhesive in extruders, causing the respective resins to flow into a die for forming a multi-layer parison to put them together, extruding the joined resins into a multi-layer tubular parison, holding the parison by a split mold before it is solidified, pinching one end of the parison, and at the same time blowing up the parison up to the mold wall by introducing air into the parison, and then cooling the blown parison, thereby molding the container.

According to the present invention, there is further provided a process for producing a multi-layer hollow container, which comprises co-injecting polyglycolic acid containing at least 60 wt. % of a repeating unit represented by the following formula (1):

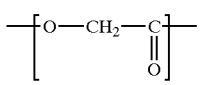

at least one thermoplastic resin, and optionally an adhesive into a closed-end parison, blowing up the parison up to the wall of a mold by introducing air into the parison in the mold after solidifying the parison once, or in a supercooled state or at a temperature not higher than the melting point, Tm of the parison without solidifying it, while stretching the parison in a longitudinal direction or without stretching it, and cooling the blown parison, thereby molding the container.

The thermoplastic resin layer may preferably be a layer formed from a thermoplastic resin selected from the group consisting of polyolefin (including polyolefin obtained by using a metallocene catalyst), polyester, polystyrene, polyvinyl chloride, polycarbonate, polyamide, polyurethane, ethylene vinyl alcohol copolymers, polyvinylidene chloride, polylactic acid, polysuccinate and polycaprolactone.

In the gas barrier multi-layer hollow containers according to the present invention, at least one of the oxygen gas transmission rate and carbon dioxide gas transmission rate of the container wall thereof as determined at 23° C. and 80% relative humidity (RH) may be reduced to at most a half of that of the container wall of a hollow container formed of the thermoplastic resin alone.

The thickness of the polyglycolic acid layer may be generally from 1 μm to 3 mm, and the total thickness of the multi-layer hollow container at the body sidewall thereof may be generally from 5 μm to 5 mm. In the gas barrier multi-layer hollow containers according to the present invention, an adhesive layer may be provided between the individual layers to improve interlayer adhesion.

BEST MODE FOR CARRYING OUT THE INVENTION

Container Wall Structure of Gas Barrier Multi-layer Hollow Container

The gas barrier multi-layer hollow containers according to the present invention are multi-layer hollow containers comprising at least one thermoplastic resin layer (hereinafter may be referred to as "base resin layer") and a polyglycolic acid layer. As needed, an adhesive layer may be provided between the individual layers. The total thickness of the gas barrier multi-layer hollow container according to the present invention at the body sidewall thereof is generally from 5 μm to 5 mm, preferably from 10 μm to 3 mm, more preferably from 20 μm to 2 mm. If this thickness is smaller than 5 μm, such a gas barrier multi-layer hollow container has a possibility that its strength may become insufficient. If the thickness exceeds 5 mm, the resulting gas barrier multi-layer hollow container becomes an excess quality, and the cost thereof becomes increased. It is hence not preferable to produce such a gas barrier multi-layer hollow container from the viewpoints of productivity and profitability.

The basic layer structures of the gas barrier multi-layer hollow containers according to the present invention are as follows. However, these layer structures are indicated with optional adhesive layer(s) omitted. The polyglycolic acid is abbreviated as PGA.

(1) Thermoplastic resin/PGA;
(2) Thermoplastic resin 1/PGA/Thermoplastic resin 1; and
(3) Thermoplastic resin 1/PGA/Thermoplastic resin 2.

In the gas barrier multi-layer hollow containers according to the present invention, various thermoplastic resin layers of the same or different kind may be additionally laminated according to properties required so far as any one of the above-described basic layer structures is provided. No particular limitation is imposed on the method for combining the thermoplastic resin layer with the polyglycolic acid layer. Various processing methods, for example, a method of co-extruding, or co-injecting the respective resins into a laminate, may be adopted.

Thermoplastic Resin Layer (Base Resin Layer)

Examples of thermoplastic resins used for the thermoplastic resin layers in the gas barrier multi-layer hollow containers according to the present invention include polyolefin resins such as very low density polyethylene (VLDPE), linear low density polyethylene (LLDPE), low density polyethylene (LDPE), medium density polyethylene (MDPE), high density polyethylene (HDPE), polypropylene (PP), ethylene.propylene rubber (EPM), ethylene.vinyl acetate copolymers (EVAs), ethylene-acrylic ester copolymers (EEAs) and ionomers (IOs); polyester resins such as polyethylene terephthalate (PET) and polyethylene naphthalate (PEN); polystyrene resins such as polystyrene (PS), high impact polystyrene (HIPS), styrene.butadiene.styrene block copolymers (SBSs) and hydrogenated SBSs (i.e., SEBSs); polyvinyl chloride (PVC) resins such as rigid polyvinyl chloride and flexible polyvinyl chloride; and polycarbonate (PC), polyamide (PA), polyurethane (PU), ethylene vinyl alcohol copolymers (EVOHs) and polyvinylidene chloride resins (PVDCs).

Preferable examples of thermoplastic resins which scarcely impose burden on the environment include biodegradable polymers such as polylactic acid, polysuccinate and polycaprolactone.

In the gas barrier multi-layer hollow containers according to the present invention, these thermoplastic resin layers are used in the form of a single-layer structure or a multi-layer structure. It is desirable from the viewpoints of processability, profitability, etc. that the thickness of the thermoplastic resin layer should be within a range of generally from 4 μm to 5 mm, preferably from 10 μm to 3 mm, more preferably from 20 μm to 2 mm.

Adhesive Layer

In order to enhance the adhesion between the thermoplastic resin layer and the polyglycolic acid layer, an adhesive layer may be provided between the individual layers in the present invention. Examples of an adhesive used for the adhesive layer include polymers such as carboxylated polyolefin, epoxidized polyolefin, ethylene.vinyl acetate copolymers, ionomers, polyurethane, epoxy resins, SBS, SEBS, polychloroprene, styrene.butadiene copolymer rubber (SBR) and natural rubber (NR).

The carboxylated polyolefin means a polyolefin modified with an unsaturated acid monomer such as acrylic acid, methacrylic acid or maleic anhydride to introduce a carboxyl group into the polyolefin. The introduction of the carboxyl group may be conducted by either a copolymerization process or a grafting process. The above unsaturated acid monomer may be used in combination with a vinyl monomer such as a methacrylic ester, acrylic ester or vinyl acetate.

The epoxidized polyolefin means a polyolefin modified with an epoxy group-containing monomer such as glycidyl methacrylate to introduce an epoxy group into the polyolefin. The introduction of the epoxy group may be conducted by either a copolymerization process or a grafting process. The above epoxy group-containing monomer may be used in combination with a vinyl monomer such as a methacrylic ester, acrylic ester or vinyl acetate.

Of these polymers, the carboxylated polyolefin and ethylene.vinyl acetate copolymers are particularly preferred from the viewpoints of adhesion and processability. The thickness of the adhesive layer is within a range of generally from 0.5 μm to 2 mm, preferably from 2 μm to 1 mm, more preferably from 3 μm to 0.5 mm. If the thickness of the adhesive layer is smaller than 0.5 μm, there is a possibility that the adhesion may become insufficient. If the thickness exceeds 2 mm, the production cost of the resulting gas barrier multi-layer hollow container is increased, and so it is disadvantageous to provide the adhesive layer in such a great thickness from the viewpoint of profitability.

Polyglycolic Acid Layer

In the gas barrier multi-layer hollow containers according to the present invention, a polyglycolic acid layer is laminated as a gas barrier resin layer on the thermoplastic resin layer for the purpose of improving the oxygen gas barrier property and/or carbon dioxide gas barrier property of the thermoplastic resin layer. In the case where a general thermoplastic resin layer is used, both oxygen gas barrier property and carbon dioxide gas barrier property are improved.

The polyglycolic acid useful in the practice of the present invention is a polymer containing a repeating unit represented by the following formula (1):

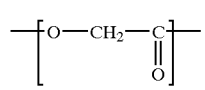
(1)

The proportion of the repeating unit represented by the formula (1) in the polymer is generally at least 60 wt. %, preferably at least 70 wt. %, more preferably at least 80 wt. %. If the proportion of the repeating unit represented by the formula (1) is lower than 60 wt. %, there is a possibility that the barrier properties of the resulting gas barrier multi-layer hollow container may be impaired.

As examples of other repeating units than the repeating unit represented by the formula (1), may be mentioned a repeating unit represented by the following formula (2):

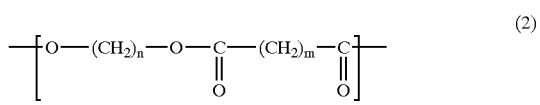

wherein n is 1–10, and m is 0–10, a repeating unit represented by the following formula (3):

wherein j is 1–10, a repeating unit represented by the following formula (4):

wherein $R_1$ and $R_2$ are independently a hydrogen atom or an alkyl group having 1 to 10 carbon atoms, and k is 2–10, a repeating unit represented by the following formula (5):

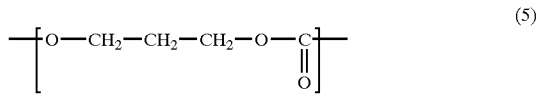

and a repeating unit represented by the following formula (6):

When these repeating units (2) to (6) are introduced in a proportion of at least 1 wt. %, the melting point, Tm of the resulting glycolic acid homopolymer can be lowered. When the Tm of the polyglycolic acid is lowered, the processing temperature of the polymer can be lowered. Therefore, thermal decomposition upon melt processing can be reduced. Besides, the crystallization rate of the polyglycolic acid can also be controlled by copolymerization to improve its extrudability and stretchability. If the proportion of these repeating units (2) to (6) exceeds 40 wt. %, the gas barrier properties inherent in the polyglycolic acid are impaired, and there is a possibility that the toughness and heat resistance of the resulting resin layer may be deteriorated.

<Molecular Weight—Melt Viscosity>

The polyglycolic acid used in the gas barrier multi-layer hollow containers according to the present invention is a high-molecular weight polymer. The melt viscosity of the polyglycolic acid can be used as an index to its molecular weight. The polyglycolic acid used in the present invention has a melt viscosity, η* of generally 500 to 100,000 Pa·s, preferably 1,000 to 50,000 Pa·s, more preferably 1,500 to 20,000 Pa·s as measured at a temperature of (Tm+20° C.) (i.e., a temperature corresponding to a usual melt-processing temperature) and a shear rate of 100/sec.

If the melt viscosity, η* of the polyglycolic acid is lower than 500 Pa·s, there is a possibility that a melt of the polyglycolic acid may undergo drawdown upon its melt-molding into a hollow container, resulting in difficulty in melt processing, or the toughness of the resulting resin layer may become insufficient. If the melt viscosity, $\eta^*$ of the polyglycolic acid exceeds 100,000 Pa·s, a higher temperature is required of its melt processing, and there is hence a possibility that the polyglycolic acid may undergo heat deterioration upon the processing.

<Thermal Properties>

The melting point, Tm of the polyglycolic acid used in the present invention is generally at least 150° C., preferably at least 180° C., more preferably at least 200° C., often at least 210° C. The melt enthalpy, $\Delta$Hm of the polyglycolic acid used in the present invention is generally at least 20 J/g, preferably at least 30 J/g, more preferably at least 40 J/g. If the Tm or $\Delta$Hm of the polyglycolic acid is too low, there is a possibility that the gas barrier properties, heat resistance, mechanical strength and the like of the resulting resin layer may become insufficient.

<Preparation Process of Polyglycolic Acid>

The polyglycolic acid used in the present invention can be prepared in accordance with, for example, the following ① ring-opening polymerization process or ② polycondensation process.

① The process comprises heating glycolide (i.e., 1,4-dioxane-2,5-dione) to a temperature of about 120° C. to 250° C. in the presence of a small amount of a catalyst (for example, a cationic catalyst such as a tin organic carboxylate, tin halide or antimony halide) to subject the glycolide to ring-opening polymerization. The ring-opening polymerization is preferably conducted by a bulk polymerization process or solution polymerization process.

② The polycondensation process comprises heating glycolic acid or an alkyl glycolate in the presence or absence of a catalyst to subject the glycolic acid or alkyl glycolate to dehydration or dealcoholization.

In order to obtain a polyglycolic acid copolymer, it is only necessary to copolymerize glycolide, glycolic acid or an alkyl glycolate in accordance with the above process ① or ② in suitable combination with, as a comonomer, for example, a cyclic monomer such as ethylene oxalate (i.e., 16 1,4-dioxane-2,3-dione), lactide, a lactone (for example, $\beta$-propiolactone, $\beta$-butyrolactone, pivalolactone, $\gamma$-butyrolactone, $\delta$-valerolactone, $\beta$-methyl-$\delta$-valerolactone or $\epsilon$-caprolactone), trimethylene carbonate or 1,3-dioxane; a hydroxycarboxylic acid such as lactic acid, 3-hydroxypropanoic acid, 3-hydroxybutanoic acid, 4-hydroxybutanoic acid or 6-hydroxycaproic acid, or an alkyl ester thereof; a substantially equimolar mixture of an aliphatic diol such as ethylene glycol or 1,4-butanediol and an aliphatic dicarboxylic acid such as succinic acid or adipic acid or an alkyl ester thereof; or two or more compounds thereof.

The polyglycolic acid copolymer may also be a polymer obtained by subjecting the polyglycolic acid and, for example, another polymer having repeating units selected from the formulae (2) to (5) to transesterification under heating.

Of the above preparation processes, the ring-opening polymerization process ① is preferred because a higher-molecular weight polyglycolic acid is obtained.

As the glycolide (dimeric cyclic ester of glycolic acid) used as a monomer in the preparation process ①, glycolide obtained by "solution-phase depolymerization process" (Japanese Patent Application No. 38404/1997) developed by the present inventors is preferred to that obtained by the conventional sublimation depolymerization process of a glycolic acid oligomer, because a higher-purity product can be mass-produced at a higher yield. The use of high-purity glycolide as a monomer permits the easy provision of high-molecular weight polyglycolic acid.

According to the solution-phase depolymerization process, (1) a mixture containing a glycolic acid oligomer and at least one high-boiling polar organic solvent having a boiling point within a range of from 230 to 450° C. is heated to a temperature, at which the depolymerization of the oligomer takes place, under ordinary pressure or under reduced pressure, (2) the oligomer is dissolved in the solvent until a residual rate (volume ratio) of a melt phase of the oligomer reaches 0.5 or lower, (3) the heating is further continued at the same temperature to depolymerize the oligomer, (4) a dimeric cyclic ester (i.e., glycolide) formed is distilled out together with the high-boiling polar organic solvent, and (5) the glycolide is recovered from the distillate.

Examples of the high-boiling polar organic solvent include aromatic carboxylic acid esters, such as bis (alkoxyalkyl) phthalates such as di(2-methoxyethyl) phthalate, alkylene glycol dibenzoates such as diethylene glycol dibenzoate, benzylbutyl phthalate, and dibutyl phthalate; and aromatic phosphoric acid esters such as tricresyl phosphate. The high-boiling polar organic solvent is used in a proportion of generally 0.3 to 50 times (weight ratio) to the glycolic acid oligomer. Polypropylene glycol, polyethylene glycol, tetraethylene glycol or the like may be used as a solubilizing agent for the glycolic acid oligomer in combination with the high-boiling polar organic solvent as needed. The depolymerization temperature of the glycolic acid oligomer is generally 230° C. or higher, preferably 230 to 320° C. Although the depolymerization is conducted under either atmospheric pressure or reduced pressure, it is preferred to heat the oligomer under reduced pressure of 6.1 to 90.0 kPa (1 to 900 mbar) to depolymerize it.

As the polyglycolic acid layer used in the present invention, a neat resin of the polyglycolic acid may be used by itself. However, a resin composition obtained by incorporating inorganic fillers, other thermoplastic resins, plasticizers and the like into the polyglycolic acid within limits not impeding the objects of the present invention may also be used. More specifically, there may be used a resin composition (compound) obtained by incorporating the inorganic fillers, other thermoplastic resins and plasticizers in proportions of generally 0 to 30 parts by weight, 0 to 30 parts by weight and 0 to 50 parts by weight, respectively, per 100 parts by weight of the polyglycolic acid. If the inorganic fillers or other thermoplastic resins are used in a proportion exceeding 30 parts by weight, or the plasticizers are used in a proportion exceeding 50 parts by weight, there is a possibility that the barrier properties of the resulting polyglycolic acid layer may become insufficient, or the melt processability of the resin layer may be deteriorated.

Examples of the inorganic fillers include powders, whiskers and fibers of alumina, silica, silica-alumina, zirconia, titanium oxide, iron oxide, boron oxide, calcium carbonate, calcium silicate, calcium phosphate, calcium sulfate, magnesium carbonate, magnesium silicate, magnesium phosphate, magnesium sulfate, kaolin, talc, mica, ferrite, carbon, silicon, silicon nitride, molybdenum disulfide, glass, potassium titanate and the like. These inorganic fillers may be used either singly or in any combination thereof.

Examples of the other thermoplastic resins include a homopolymer and copolymers of lactic acid, a homopolymer and copolymers of ethylene oxalate, a homopolymer and copolymers of $\epsilon$-caprolactone, polysuccinate, polyhydroxybutanoic acid, hydroxybutanoic acid-hydroxyvaleric acid copolymers, cellulose acetate, polyvinyl alcohol, starch, polyglutamate, natural rubber, polyethylene, polypropylene, styrene-butadiene copolymer rubber, acrylonitrile-butadiene copolymer rubber, polymethyl methacrylate, polystyrene, styrene-butadiene-styrene block copolymers, styrene-ethylene butylene-styrene block copolymers, ABS resins, MBS resins and ethylene-vinyl alcohol copolymers. These thermoplastic resins may be used either singly or in any combination thereof.

Examples of the plasticizers include phthalates such as di(methoxyethyl) phthalate, dioctyl phthalate, diethyl phthalate and benzylbutyl phthalate; benzoates such as diethylene glycol dibenzoate and ethylene glycol dibenzoate; aliphatic dibasic acid esters such as dioctyl adipate and dioctyl sebacate; aliphatic tribasic acid esters such as tributyl acetylcitrate; phosphates such as dioctyl phosphate and tricresyl phosphate; epoxy plasticizers such as epoxidized soybean oil; and fatty acid esters of polyalkylene glycol, such as polyethylene glycol disebacate and polypropylene glycol dilaurate. These plasticizers may be used either singly or in any combination thereof.

In the present invention, various additives such as heat stabilizers, light stabilizers, moistureproofing agents, waterproofing agents, water repellents, lubricants, parting agents, coupling agents, pigments and dyes may be added to the polyglycolic acid as needed. These various additives are used in an effective amount as necessary for the end application intended.

Physical Properties of Body Sidewall of Gas Barrier Multi-layer Hollow Container In the gas barrier multi-layer hollow container according to the present invention, the oxygen gas transmission rate and/or the carbon dioxide gas transmission rate of the body sidewall thereof is improved or reduced to at most a half, preferably at most a fifth, more preferably at most a tenth compared with the respective values of the thermoplastic resin layer.

More specifically, the gas barrier multi-layer hollow containers according to the present invention are hollow containers at least one of the oxygen gas transmission rate and carbon dioxide gas transmission rate of which has been surprisingly improved by combining the polyglycolic acid layer as a barrier property improver with a thermoplastic resin layer formed of a resin selected from, for example, polyolefin, polyester, polystyrene, polyvinyl chloride, polycarbonate, polylactic acid, polysuccinate, polycaprolactone, polyamide, EVOH, polyurethane, PVDC, etc. compared with that of the thermoplastic resin layer alone.

In addition, the gas barrier multi-layer hollow containers according to the present invention have a great feature that their gas barrier properties are scarcely lowered even when they are treated under high-temperature and high-humidity conditions.

Production Process of Gas Barrier Multi-layer Hollow Container

The object of making a hollow container a multi-layer structure is to achieve required properties, which cannot be achieved by a single-layer structure, by providing the multi-layer structure. Specifically, the objects to be achieved include the impartment of gas barrier properties to oxygen, carbon dioxide, etc., the impartment of heat sealability, the improvement of moisture resistance, the improvement of mechanical strength, cost reduction to a great extent, etc.

Roughly speaking, the following processes may be used as processes for producing a gas barrier multi-layer hollow container.

"Multi-layer extrusion blow molding process" and "multi-layer injection blow molding process" may be mainly adopted as the production processes of the gas barrier multi-layer hollow container. Both blow molding processes include "stretch blow molding process" in which uniaxial or biaxial stretching is conducted upon blow molding, and "unstretch blow molding process" in which no stretching conducted. The "stretch blow molding process" is a process in which stretching is conducted upon blow molding, thereby orienting the molecular chain of a polymer to enhance the physical properties of the polymer, such as transparency, strength, elastic modulus and gas barrier properties. In order to enhance such physical properties, it is essential to keep a parison at a temperature not higher than its melting point, but not lower than its glass transition point, Tg upon stretch blow molding.

<Multi-Layer Extrusion Blow Molding Process>

In the multi-layer extrusion blow molding process according to the present invention, a multi-layer parison composed of polyglycolic acid, at least one thermoplastic resin, and optionally an adhesive is first formed. In order to form the parison, the respective resins heated and melted in respective extruders are caused to flow into a die for forming a multi-layer parison (usually, a circular die) to put them together within the die simultaneously or successively, and the joined resins are extruded through the die into a multi-layer tubular parison. The parison melt-extruded is held by a split mold before it is solidified, and one end of the parison is pinched off to blow up the parison up to the mold wall by introducing air into the parison. The blown parison is then cooled. After the cooling, the mold is opened to take a molded product out of the mold. When the parison is uniaxially or biaxially stretched in a supercooled state or at a temperature not higher than the crystallization temperature ($Tc_1$) of the parison and within a temperature range somewhat higher than the glass transition temperature, Tg of the parison, a molded product uniaxially or biaxially stretched can be obtained.

<Multi-Layer Injection Blow Molding Process>

The multi-layer injection blow molding comprises injection-molding a closed-end parison (preform) in the form of a test tube by injection molding and subjecting this parison to blow molding in a supercooled state or at a temperature not lower than the glass transition point, Tg of the parison. In the multi-layer injection blow molding, a method in which the temperature of the parison is controlled to a temperature not higher than the melting point, Tm of the parison without solidifying the parison after the injection molding to subject the parison to blow molding is a hot parison method. On the other hand, a method in which the parison is cooled and solidified once after the injection molding, and the solidified parison is then heated again to a temperature not lower than Tg to control its temperature, and subjected to blow molding is a cold parison method. The hot parison method includes stretch blow molding and unstretch blow molding, while the cold parison method is generally stretch blow molding alone.

In the multi-layer injection blow molding according to the present invention, a preform is molded from polyglycolic acid, at least one thermoplastic resin, and optionally an adhesive by a co-injection process, and the preform thus obtained is blow-molded by the hot parison method or cold parison method. At this time, stretch blow molding or unstretch blow molding is conducted.

Application Fields

The gas barrier multi-layer hollow containers according to the present invention can be used as, for example, hollow containers for drink and food, toiletry containers and gasoline containers making good use of their excellent oxygen gas barrier property and/or carbon dioxide gas barrier property. In particular, they are preferably used as packaging containers for goods which require a treatment under high-temperature and high-humidity conditions, such as retorting, goods which particularly require a long-term storage, goods which require high carbon dioxide gas barrier property, goods which require to lighten burden on the environment, etc.

EXAMPLES

The present invention will hereinafter be described more specifically by the following Synthesis Example, Examples and Comparative Examples.

Measuring Methods of Physical Properties
(1) Melt Viscosity, $\eta^*$:

As an index to the molecular weight of each polymer, its melt viscosities, $\eta^*$ was measured. A crystallized sheet obtained by heating an amorphous sheet about 0.2 mm thick formed of the polymer at about 150° C. for 5 minutes was used as a sample to measure the melt viscosity of the sample at a temperature of (Tm+20° C.) and a shear rate of 100/sec by means of a "Capirograph" (manufactured by Toyo Seiki Seisakusho, Ltd.) equipped with a nozzle having a diameter (D) of 0.5 mm and a length (L) of 5 mm.

(2) Thermal Properties of Polymer:

An amorphous sheet about 0.2 mm thick formed of each polymer was used as a sample and heated by means of a differential scanning calorimeter (DSC; TC-10A Model, manufactured by Mettler Instrument AG) at a rate of 10° C./min under a nitrogen gas stream, thereby measuring the crystallization temperature ($Tc_1$), melting point (Tm) and melt enthalpy ($\Delta Hm$) of the sample. The glass transition temperature (Tg) was measured at a heating rate of 5° C./min.

(3) Oxygen Gas Transmission Rate ($O_2$ Transmission Rate):

The oxygen gas transmission rate of a sample, which had been cut out of a body sidewall of each blow molded container, was measured at 23° C. and 80% RH in accordance with JIS K-7126 by means of a double-side moistening gas transmission tester manufactured by GL Sciences Inc. to determine its oxygen gas transmission rate in terms of a value in a film thickness of 1 mm.

(4) Carbon Dioxide Gas Transmission Rate ($CO_2$ Transmission rate):

The carbon dioxide gas transmission rate of a sample, which had been cut out of a body sidewall of each blow molded container, was measured at 23° C. and 80% RH in accordance with JIS K-7126 by means of a double-side moistening gas transmission tester manufactured by GL Sciences Inc. to determine its carbon dioxide gas transmission rate in terms of a value in a film thickness of 1 mm.

Synthesis Example 1

Synthesis of Monomer

A 10-liter autoclave was charged with 5 kg of glycolic acid (product of Wako Pure Chemical Industries, Ltd.). While stirring, the temperature of the contents was raised from 170° C. to 200° C. over about 2 hours to heat them, whereby glycolic acid was condensed while distilling off water formed. The pressures inside the autoclave was then reduced to 20 kPa (200 mbar), and the reaction mixture was held for 2 hours under such a pressure, thereby distilling off low-boiling matter to prepare a glycolic acid oligomer. The melting point, Tm of the thus-obtained glycolic acid oligomer was 205° C.

A 10-liter flask was charged with 1.2 kg of the glycolic acid oligomer, and 5 kg of benzylbutyl phthalate (product of Junsei Chemical Co., Ltd.) as a solvent and 150 g of polypropylene glycol (#400, product of Junsei Chemical Co., Ltd.) as a solubilizing agent were added thereto. The mixture was heated to about 270° C. under reduced pressure of 5.0 kPa (50 mbar) in a nitrogen gas atmosphere to conduct "solution-phase depolymerization" of the glycolic acid oligomer. Glycolide formed was distilled out together with benzylbutyl phthalate.

Cyclohexane about twice by volume as much as the distillate was added to the distillate collected, whereby glycolide was crystallized from benzylbutyl phthalate and collected by filtration. The glycolide thus obtained was recrystallized from ethyl acetate and dried under reduced pressure to obtain purified glycolide.

Polymer Preparation Example 1

A PFA-made cylinder was charged with 200 g of glycolide obtained in Synthesis Example 1, and the glycolide was dried at room temperature for about 30 minutes while introducing nitrogen gas therein. As a catalyst, 0.04 g of $SnCl_4 \cdot 6.5H_2O$ were added, and the contents were held at 170 to 175° C. for 2 hours while introducing nitrogen gas therein, thereby polymerizing glycolide. After completion of the polymerization, the cylinder was cooled down to room temperature, and a polymer taken out of the cylinder was ground and dried overnight at about 150° C. under reduced pressure of about 0.1 kPa (=1 mbar) or lower to remove a remaining monomer, thereby obtaining polyglycolic acid [Polymer (P-1)]. The same process was conducted repeatedly to prepare a necessary amount of Polymer (P-1).

Polymer Preparation Example 2

Polymerization and post-treatment were performed in the same manner as in Polymer Preparation Example 1 except that a mixture of 196 g of glycolide and 4 g of L-(−)-lactide was used in place of 200 g of glycolide, thereby obtaining a glycolic acid-lactide copolymer [Polymer (P-2)]. The same process was conducted repeatedly to prepare a necessary amount of Polymer (P-2).

The compositions and physical properties of the polyglycolic acids obtained in Polymer Preparation Examples 1 and 2 are shown in Table 1.

TABLE 1

| | | Polymer Preparation Example | |
|---|---|---|---|
| | | 1 | 2 |
| Composition of Monomer (wt/wt) | | GA | GA/LA = 98/2 |
| Polymer code | | P-1 | P-2 |
| $\eta^*$ (Pa · s) | | 4,000 | 3,800 |
| Thermal properties | Tg (° C.) | 38 | 38 |
| | $Tc_1$ (° C.) | 84 | 77 |
| | Tm (° C.) | 221 | 216 |
| | $\Delta Hm$ (J/g) | 72 | 68 |

(Note) GA=Glycolide; LA=L-(−)-Lactide.

Pellet Preparation Example 1

A small twin-screw kneader extruder equipped with a nozzle having a diameter of 3 mm was charged with Polymer (P-1) under a nitrogen gas stream. The polymer was extruded in the form of a strand at a melt temperature of about 230° C. to 235° C. The thus-obtained strand was air-cooled and chopped to obtain Pellet (No. 1).

Pellet Preparation Example 2

Pellet (No. 2) was prepared in the same manner as in Pellet Preparation Example 1 except that Polymer (P-2) was used, and the melt temperature was changed to about 225 to 230° C.

Example 1

Pellet (No. 1), medium density polyethylene (MDPE; MI=10 g/10 min) and carboxylated polyolefin [MODIC E-300S, trademark, product of Mitsubishi Petrochemical Company, Limited] were charged into a co-injection molding machine for 3 kinds and 5 layers and injected into a preform mold to mold a preform (outer diameter: about 2 cm; length: about 6 cm). The temperature of the preform was then controlled to about 120° C. before it was solidified, and it was inserted into a mold. A rod was inserted into the preform to stretch the preform about 2 times in a longitudinal direction, and at the same time blow up it at a blow-up ratio of about 3. The thus-blown preform was then cooled and solidified to produce a multi-layer hollow container MB-1 (body outer diameter: about 6 cm, body length: about 10 cm, neck outer diameter: about 2 cm, neck length: about 1 cm, having a concavity at the center of the flat bottom).

Example 2

A multi-layer hollow container MB-2 was produced in the same manner as in Example 1 except that Pellet (No. 2) was used in place of Pellet (NO. 1).

Example 3

Pellet (No. 1), MDPE (MI=10 g/10 min) and carboxylated polyolefin (MODIC E-300S, trademark) were charged into a multi-layer die head (circular die) for 3 kinds and 5 layers and melt-extruded in the form of a tube to produce a parison. The parison was held by a split mold for a bottle, and a bottom part thereof was pinched off. The temperature of the parison was controlled to about 120° C. to blow up the parison at a blow-up ratio of about 3. The thus-blown preform was then cooled and solidified to produce a multi-layer hollow container MB-3 (body outer diameter: about 6 cm, body length: about 10 cm, neck outer diameter: about 2 cm, neck length: about 1 cm, having a concavity at the center of the flat bottom).

Example 4

Pellet (No. 1), polyethylene terephthalate (PET; MI=13 g/10 min) and carboxylated polyolefin (MODIC E-300S, trademark) were charged into a co-injection molding machine for 3 kinds and 5 layers and injected into a preform mold to mold a preform (outer diameter: about 2 cm; length: about 6 cm). The thus-obtained preform was cooled and solidified. The preform was then heated again to control its temperature to about 85° C., and was inserted into a mold. A rod was inserted into the preform to stretch the preform about 2 times in a longitudinal direction, and at the same time blow up it at a blow-up ratio of about 3. The thus-blown preform was then cooled and solidified to produce a multi-layer hollow container MB-4.

Comparative Example 1

A multi-layer hollow container MB-C1 was produced in the same manner as in Example 1 except that MDPE was charged into the co-injection molding machine in place of Pellet (NO. 1).

Comparative Example 2

A multi-layer hollow container MB-C2 was produced in the same manner as in Example 4 except that PET (MI=13 g/10 min) was charged into the co-injection molding machine in place of Pellet (NO. 1).

Comparison of Gas Barrier Properties

The respective gas transmission rates of each sample, which had been cut out of body sidewalls of the respective hollow containers obtained in Examples 1 to 4 and Comparative Examples 1 and 2, were measured. In addition, MDPE and PET used in Examples 1 to 4 and Comparative Examples 1 and 2 were separately subjected to melt processing by means of a hot press and quenched to prepare respective base sheets BS-1 and BS-2 having a thickness of about 0.1 mm. The respective gas transmission rates of these sheets were also measured to compare them with the gas transmission rate values of the above body sidewall samples. The results are shown collectively in Table 2.

TABLE 2

| Example | Ex. 1 | Ex. 2 | Ex. 3 | Ex. 4 | Comp. Ex. 1 | Comp. Ex. 2 |
|---|---|---|---|---|---|---|
| Body sidewall | | | | | | |
| Code No. | MB-1 | MB-2 | MB-3 | MB-4 | MB-C1 | MB-C2 |
| Structure | PE/Adh/PGA/Adh/PE | PE/Adh/PGA/Adh/PE | PE/Adh/PGA/Adh/PE | PET/Adh/PGA/Adh/PET | PE/Adh/PE/Adh/PE | PET/Adh/PET/Adh/PET |
| Thickness ($\mu$m) | 49/11/10/9/51 | 50/9/10/11/50 | 49/10/10/10/50 | 28/8/10/12/32 | 52/12/9/10/50 | 29/10/10/11/30 |
| PGA · Code No. | P-1 | P-2 | P-1 | P-1 | — | — |
| $O_2$ transmission rate; 23° C., 80% RH ($cm^3 \cdot mm/m^2 \cdot day \cdot 0$ atm) | 0.3 | 0.3 | 0.3 | 0.2 | 60 | 3 |
| $CO_2$ transmission rate; 23° C., 80% RH ($cm^3 \cdot mm/m^2 \cdot day \cdot atm$) | 1.9 | 2.0 | 2.0 | 1.3 | 260 | 25 |
| Body sidewall/base sheet | MB-1/BS-1 | MB-2/BS-1 | MB-3/BS-1 | MB-4/BS-2 | MB-C1/BS-1 | MB-C2/BS-2 |

TABLE 2-continued

| Example | Ex. 1 | Ex. 2 | Ex. 3 | Ex. 4 | Comp. Ex. 1 | Comp. Ex. 2 |
|---|---|---|---|---|---|---|
| Transmission rate ratio of body sidewall/base sheet | | | | | | |
| $O_2$ | 4/1000 | 4/1000 | 4/1000 | 8/100 | — | — |
| $CO_2$ | 6/1000 | 6/1000 | 6/1000 | 7/100 | — | — |

Incidentally, the measurement results of the spective gas transmission rates of the base sheets, BS-1 d BS-2 are shown in Table 3.

TABLE 3

| Base sheet | Code No. | BS-1 | BS-2 |
|---|---|---|---|
| | Structure | PE | PET |
| | Thickness ($\mu$m) | 100 | 100 |
| $O_2$ transmission rate; 23° C., 80% RH ($cm^3 \cdot mm/m^2 \cdot day \cdot atm$) | | 70 | 2.5 |
| $CO_2$ transmission rate; 23° C., 80% RH ($cm^3 \cdot mm/m^2 \cdot day \cdot atm$) | | 300 | 20 |

INDUSTRIAL APPLICABILITY

According to the present invention, there are provided gas barrier multi-layer hollow containers suitable for use as containers for goods which require a treating process under high-temperature and high-humidity conditions, such as retorting, goods which particularly require a long-term storage, goods which particularly require high carbon dioxide gas barrier property, etc. According to the present invention, there are also provided multi-layer hollow containers far excellent in oxygen gas barrier property and carbon dioxide gas barrier property. According to the present invention, there may be further provided gas barrier multi-layer hollow containers which scarcely impose burden on the environment.

What is claimed is:

1. A gas barrier multi-layer hollow container having a multi-layer wall structure comprising a thermoplastic resin layer laminated on at least one side of a layer formed from polyglycolic acid containing at least 60 wt. % of a repeating unit represented by the following formula (1):

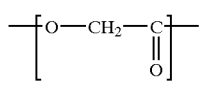

and having a melt viscosity, $\eta^*$, of 500 to 100,000 Pa·s as measured at a temperature of the melting point of the polymer+20° C. and a shear rate of 100/sec, a melting point, Tm, of at least 150° C., and a melt enthalpy, $\Delta$Hm, of at least 20 J/g, wherein said container is a blow-molded and uniaxially or biaxially stretched product.

2. The gas barrier multi-layer hollow container according to claim 1, wherein the thermoplastic resin layer is a layer formed from a thermoplastic resin selected from the group consisting of polyolefin, polyester, polystyrene, polyvinyl chloride, polycarbonate, polyamide, polyurethane, ethylene.vinyl alcohol copolymers, polyvinylidene chloride, polylactic acid, polysuccinate and polycaprolactone.

3. The gas barrier multi-layer hollow container according to claim 1, wherein at least one of the oxygen gas transmission rate and carbon dioxide gas transmission rate of the container wall thereof as measured at 23° C. and 80% relative humidity is at most a half of that of the container wall of a hollow container formed of the thermoplastic resin alone.

4. The gas barrier multi-layer hollow container according to claim 1, wherein an adhesive layer is provided between the polyglycolic acid layer and the thermoplastic layer.

5. The gas barrier multi-layer hollow container according to claim 4, wherein the adhesive layer is a layer formed from an adhesive selected from the group consisting of carboxylated polyolefin, epoxidized polyolefin, ethylene.vinyl acetate copolymers, ionomers, polyurethane, epoxy resins, styrene.butadiene.styrene block copolymer elastomers, hydrogenated styrene.butadiene.styrene block copolymer elastomers, polychloroprene, styrene.butadiene copolymer rubber and natural rubber.

6. The gas barrier multi-layer hollow container according to claim 2, wherein at least one of the oxygen gas transmission rate and carbon dioxide gas transmission rate of the container wall thereof as measured at 23° C. and 80% relative humidity is at most a half of that of the container wall of a hollow container formed of the thermoplastic resin alone.

7. The gas barrier multi-layer hollow container according to claim 2, wherein an adhesive layer is provided between the polyglycolic acid layer and the thermoplastic layer.

8. The gas barrier multi-layer hollow container according to claim 3, wherein an adhesive layer is provided between the polyglycolic acid layer and the thermoplastic layer.

9. The gas barrier multi-layer hollow container according to claim 1 wherein the polyglycolic acid is a polymer obtained by ring-opening polymerization of glycolide.

10. The gas barrier multi-layer hollow container according to claim 1, wherein the polyglycolic acid is a copolymer of glycolide in a proportion not lower than 60 wt. %, but lower than 100 wt. % and at least one comonomer selected from the group consisting of ethylene oxalate, lactide, lactones, trimethylene carbonate and 1,3-dioxane in a proportion higher than 0 wt. %, but not higher than 40 wt. %.

11. The gas barrier multi-layer hollow container according to claim 1, wherein the multi-layer wall has a layer structure of thermoplastic resin/adhesive/polyglycolic acid.

12. The gas barrier multi-layer hollow container according to claim 1, wherein the multi-layer wall has a layer structure of thermoplastic resin/adhesive/polyglycolic acid/adhesive/thermoplastic resin.

13. The gas bar ier multi-layer hollow container according to claim 12, wherein the multi-layer wall has a layer structure of polyolefin/adhesive/polyglycolic acid/adhesive/polyolefin.

14. The gas barrier multi-layer hollow container according to claim 12, wherein the multi-layer wall has a layer structure of polyester/adhesive/polyglycolic acid/adhesive/polyester.

15. A process for producing a multi-layer hollow container, which comprises respectively heating and melting polyglycolic acid containing at least 60 wt. % of a repeating unit represented by the following formula (1):

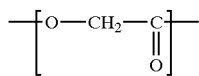 (1), at least one thermoplastic resin, and an adhesive in extruders, causing the respective resins to flow into a die for forming a multi-layer tubular parison, holding the parison by a split mold before it is solidified, pinching off one end of the parison, and at the same time blowing up the parison to the mold wall by introducing air into the parison, and then cooling the blown parison, thereby molding the container.

16. A process for producing a multi-layer hollow container, which comprises co-injecting polyglycolic acid containing at least 60 wt. % of a repeating unit represented by the following formula (1):

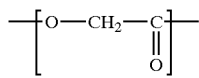 (1), and having a melt viscosity, $\eta^*$, of 500 to 100,000 Pa·s as measured at a temperature of the melting point of the polymer+20° C. and a shear rate of 100/sec, a melting point, Tm, of at least 150° C., and a melt enthalpy, ΔHm, of at least 20 J/g, at least one thermoplastic resin, and optionally an adhesive into a closed-end parison, blowing up the parison to the mold wall by introducing air into the parison in the mold after solidifying the parison once, or in a supercooled state or at a temperature not higher than the melting point, Tm, but not lower than the glass transition point, Tg, of the parison without solidifying it, while stretching the parison in a longitudinal direction and cooling the blown parison, thereby molding the container.

17. A gas barrier multi-layer hollow container having a multi-layer wall structure comprising a thermoplastic resin layer laminated on each side of a layer formed from polyglycolic acid containing at least 60 wt. % of a repeating unit represented by the following formula (1):

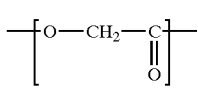 (1), wherein an adhesive layer is provided between the polyglycolic acid layer and each thermoplastic layer, and wherein the container is a blow-molded product.

* * * * *

UNITED STATES PATENT AND TRADEMARK OFFICE
CERTIFICATE OF CORRECTION

PATENT NO. : 6,673,403 B1
DATED : January 6, 2004
INVENTOR(S) : Zenya Shiiki et al.

It is certified that error appears in the above-identified patent and that said Letters Patent is hereby corrected as shown below:

Column 16,
Line 60, change "bar ier" to -- barrier --.

Signed and Sealed this

Thirtieth Day of March, 2004

JON W. DUDAS
*Acting Director of the United States Patent and Trademark Office*